J. C. LARSON.
SHOP TRUCK.
APPLICATION FILED JULY 21, 1911.

1,015,966.

Patented Jan. 30, 1912.

Witnesses:
C. C. Palmer.
F. W. Hoffmeister.

Inventor.
James C. Larson
By E. W. Burgess
Attorney.

UNITED STATES PATENT OFFICE.

JAMES C. LARSON, OF AUBURN, NEW YORK, ASSIGNOR TO INTERNATIONAL HARVESTER COMPANY, A CORPORATION OF NEW JERSEY.

SHOP-TRUCK.

1,015,966.  Specification of Letters Patent.  Patented Jan. 30, 1912.

Application filed July 21, 1911. Serial No. 639,715.

*To all whom it may concern:*

Be it known that I, JAMES C. LARSON, a citizen of the United States, residing at Auburn, in the county of Cayuga and State of New York, have invented certain new and useful Improvements in Shop-Trucks, of which the following is a specification.

My invention relates to trucks, and in particular to such as are used in large numbers in factories for receiving and transporting material and parts from room to room and from one machine to another; the object of my invention being to provide a construction of truck that will permit more of them being placed upon a given floor area than those as heretofore constructed. I attain this object by means of the mechanism illustrated by the accompanying drawing, in which—

Figure 1:
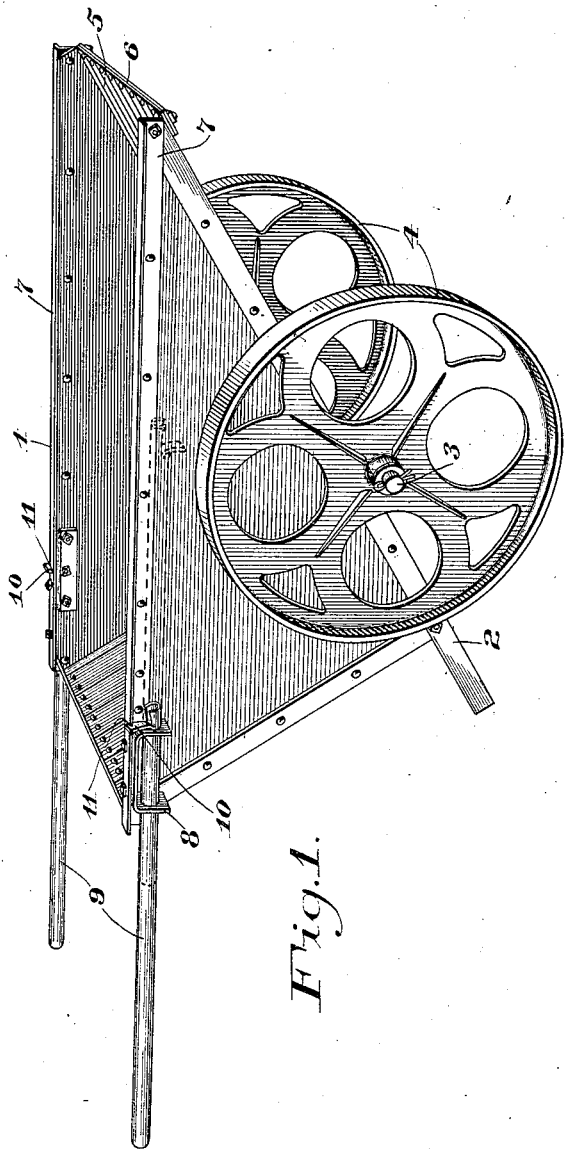
Figure 2:
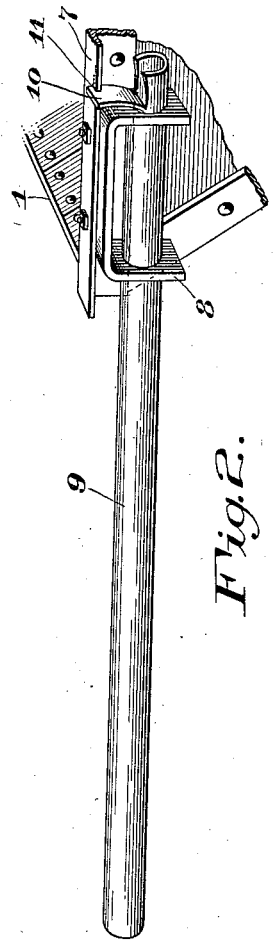

Figure 1 is a perspective view of a truck having my invention embodied in its construction; and Fig. 2 is a detached detail designed to illustrate the manner of attaching truck handles to the body thereof.

The same reference characters designate like parts throughout the several views.

1 represents the body of a truck having bed frame members 2, to which may be secured an axle member 3 in any preferred manner, and upon which may be journaled the wheels 4. The side walls of the body are preferably triangular in form, having their upper edges inclining downward from the rear toward the front, the bottom 5 of the body at its front end being but a little below the upper edge of the side walls and secured to a transverse member 6. Top rails 7 are secured to the side walls of the body along their upper edges and made with angle bars, having one web thereof arranged in a horizontal plane and projecting outward from the body.

8 represents inverted U-shaped bracket members that are secured to the rear ends of the top rails of the truck body, having the legs thereof provided with openings adapted to receive handles 9 in a slidable manner, the handles being preferably tubular in form and provided at their front ends with a laterally turned lip portion 10, the rails being provided with a notch 11 adjacent the brackets adapted to receive the edge of the lip portion in a manner preventing a sliding movement of the handles when they are in an operative position. When the handles are rocked outward in their bearings in the brackets sufficient to release them from engagement with the notches in the rails, they may be moved longitudinally to the brackets toward the front end of the truck body, as shown by dotted lines in Fig. 1, in which position they will permit a close grouping of a series of trucks in a given floor space.

What I claim as my invention, and desire to secure by Letters Patent, is:

A shop truck including, in combination, a body mounted upon wheels, said body including top rails, inverted U-shaped brackets secured to said rails upon opposite sides of said body and provided with openings in their leg portions, handles slidably received by said openings, said handles having laterally turned lip portions at their front ends, said rails having notches therein adapted to receive said lip portions when said handles are extended relative to said body.

J. C. LARSON.

Witnesses:
K. T. ELLIOTT,
C. W. EMBODY.

Copies of this patent may be obtained for five cents each, by addressing the "Commissioner of Patents. Washington, D. C."